United States Patent [19]
Nagashima et al.

[11] Patent Number: 5,263,765
[45] Date of Patent: Nov. 23, 1993

[54] AUTOMATIC ADJUSTABLE SEAT

[75] Inventors: Hideyuki Nagashima, Yokohama; Yoichi Kishi, Yokosuka, both of Japan

[73] Assignee: Nissan Motor Co., Ltd., Yokohama, Japan

[21] Appl. No.: 931,518

[22] Filed: Aug. 21, 1992

Related U.S. Application Data

[63] Continuation of Ser. No. 633,948, Dec. 26, 1990, abandoned.

[30] Foreign Application Priority Data

Dec. 27, 1989 [JP] Japan .................. 1-336568

[51] Int. Cl.⁵ .............................................. A47C 3/00
[52] U.S. Cl. ...................... 297/284.6; 297/DIG. 3; 297/284.11; 297/284.9
[58] Field of Search ............ 297/284.1, 284.2, 284.3, 297/284.4, 284.6, DIG. 3, 284.11

[56] References Cited

U.S. PATENT DOCUMENTS

| | | | |
|---|---|---|---|
| 4,592,588 | 6/1986 | Isono et al. | 297/284 |
| 4,634,179 | 1/1987 | Hashimoto et al. | 297/DIG. 3 X |
| 4,655,505 | 4/1987 | Kashiwamura et al. | 297/DIG. 3 X |
| 4,722,550 | 2/1988 | Imaoka et al. | 297/DIG. 3 X |
| 4,833,614 | 5/1989 | Saitoh et al. | 297/284 X |
| 4,981,131 | 1/1991 | Hazard | 297/284.1 X |
| 5,005,904 | 4/1991 | Clemens et al. | 297/284.6 |

FOREIGN PATENT DOCUMENTS

| | | | |
|---|---|---|---|
| 2441705 | 11/1976 | Fed. Rep. of Germany | 297/284 |
| 2553186 | 6/1977 | Fed. Rep. of Germany | 297/468 |
| 257333 | 7/1946 | Japan . | |

Primary Examiner—Kenneth J. Dorner
Assistant Examiner—Milton Nelson, Jr.
Attorney, Agent, or Firm—Leydig, Voit & Mayer

[57] ABSTRACT

A seat comprises a plurality of air mats which are arranged inside a seat cushion and a seat back. The contour of each of the air mats is automatically variable by a pump and a valve according to an automatic mode of variation. When a manual switch is turned on to control the valve, an initial mode of variation is altered by incorporating a manual command so as to determine a second mode of variation. The seat contour is then varied according to the second mode.

33 Claims, 3 Drawing Sheets

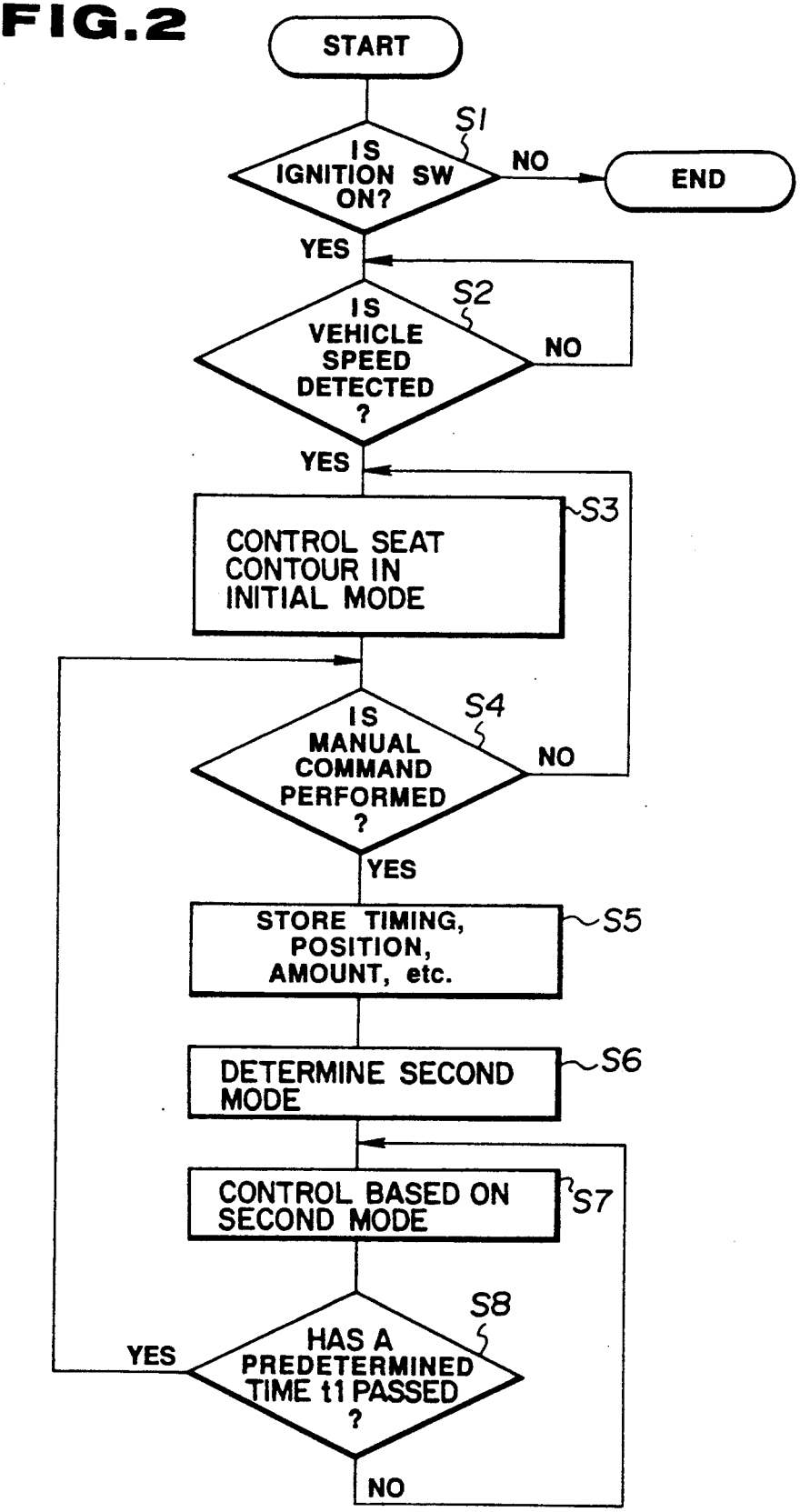

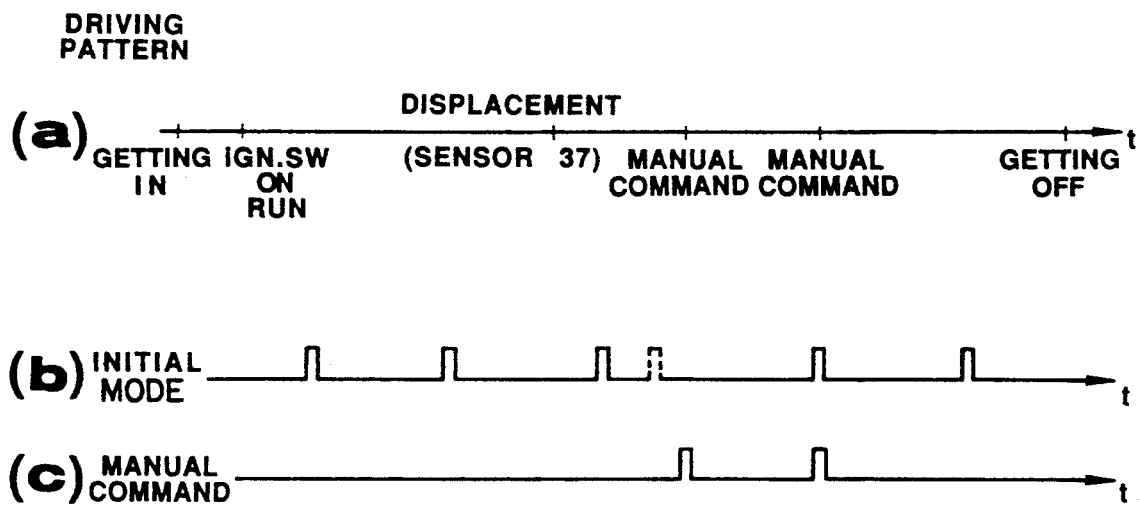
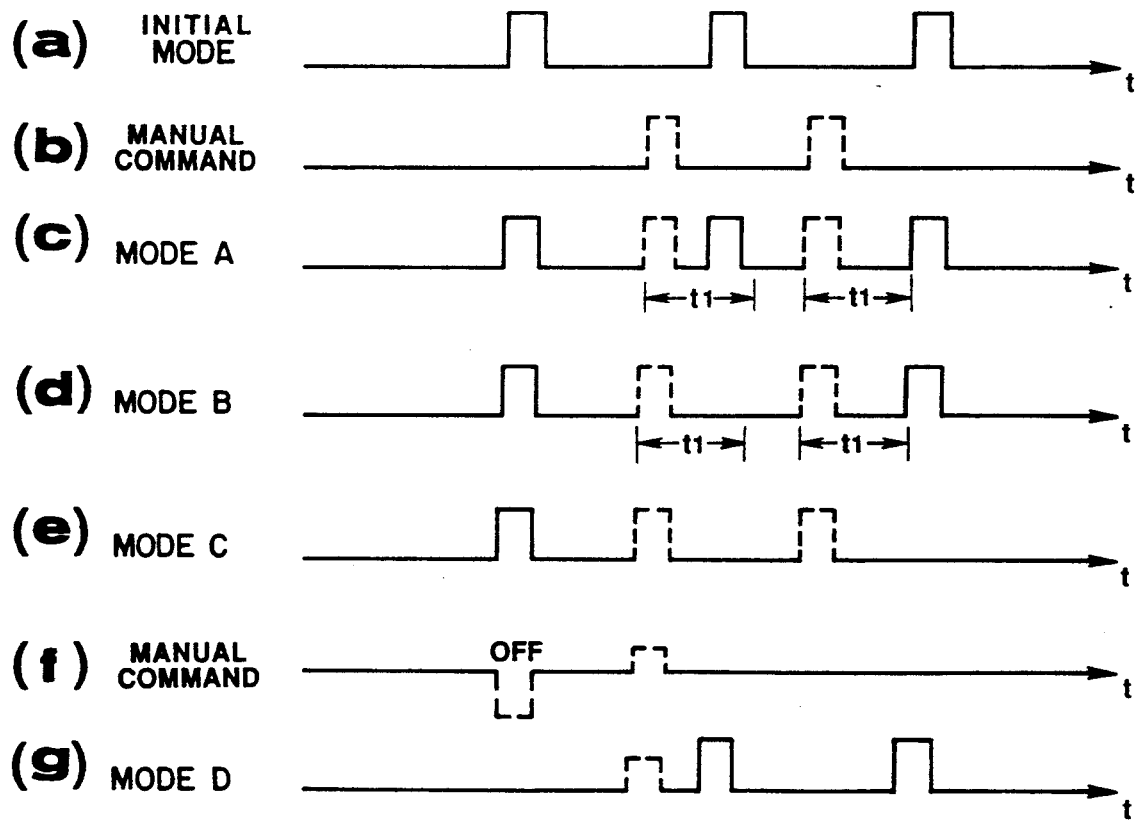

AUTOMATIC ADJUSTABLE SEAT

This application is a continuation of application Ser. No. 07/633,948, filed Dec. 26, 1990 and now abandoned.

BACKGROUND OF THE INVENTION

The present invention relates to a seat which includes a plurality of portions which can be varied with respect to form and hardness.

Various kinds of seats for a motor vehicle of this type have been proposed in past years. One such seat is disclosed in JP 61-257333. This seat has a side support portion, a center support portion, and a front support portion which include support members therein. The contour of the seat is variable by expanding and contracting each of the support members. In the event of long driving, each of the support members is controlled at a predetermined cycle by a timer so as to vary the contour of the seat. This variation in contour of the seat results in a periodic change in the posture of a seat occupant, decreasing the fatigue of the occupant during driving.

With such a known seat for a motor vehicle, however, since each of the support members is controlled only with a predetermined cyclic pattern which can not be changed, the same cyclic pattern is applied to any seat occupant, causing the seat occupant discomfort in some cases.

SUMMARY OF THE INVENTION

It is, therefore, an object of the present invention to provide a seat having a variable contour which contributes to a decrease in the fatigue of a seat occupant without causing any discomfort.

A seat according to the present invention includes a seat cushion and a seat back extending form the seat cushion. One or more supports is disposed within the seat cushion or seat back, and an actuator is operatively connected to the supports for varying a characteristic of the supports. A command generating means is provided for allowing a seat occupant to generate a manual command for the actuator. The actuator is controlled by a control system which automatically selects a first operating state for the actuator in which the actuator varies a characteristic of the support according to a first mode of variation. When a command from the command generating means is generated, the control system controls the actuator to switch from the first operating state to a second operating state in which the actuator varies a characteristic of the support according to a second mode of variation.

The seat may also include fatigue sensing means for sensing fatigue of the seat occupant. When the fatigue sensing means senses fatigue, the control system controls the actuator to operate in the first operating state until a command is generated from the command generating means.

BRIEF DESCRIPTION OF THE DRAWINGS

FIG. 2 is a flowchart showing the operation of the preferred embodiment shown in FIG. 1;

FIG. 3 is a time chart showing the relationship between a typical driving pattern of a motor vehicle and the control timing of an automatic mode and manual command; and FIG. 4 is a view similar to FIG. 3, showing subsequent modes.

DETAILED DESCRIPTION OF THE INVENTION

Figure 1:
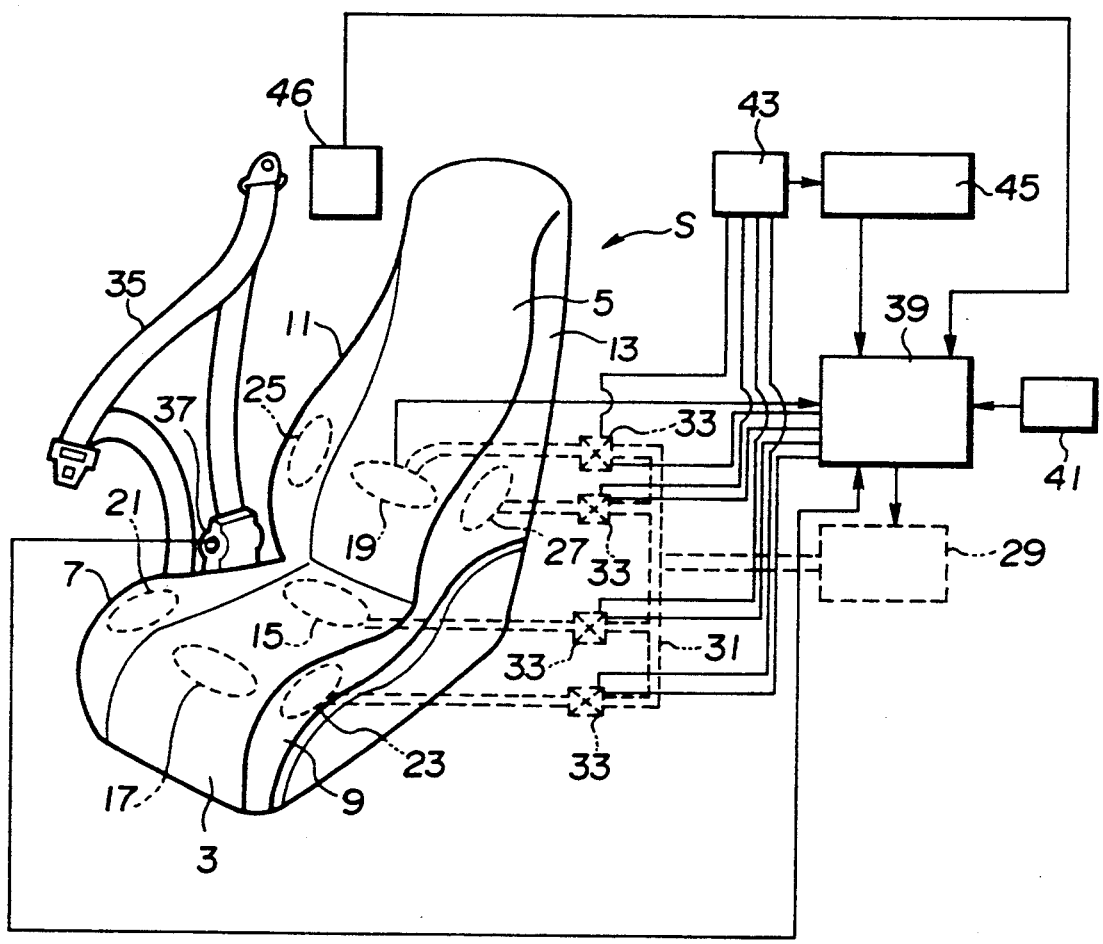
FIG. 1 is a diagrammatic view illustrating a preferred embodiment of a seat according to the present invention.

Referring to the accompanying drawings, a preferred embodiment of a seat according to the present invention will be described.

Referring to FIG. 1, a seat S for a motor vehicle includes a seat cushion 3 and a seat back 5. The seat cushion 3 includes cushion side support portions 7 and 9 on both sides thereof, whereas the seat back 5 includes back side support portions 11 and 13 on both sides thereof.

Inside the seat cushion 3 are arranged, as support means, a buttock support air mat 15 and a thigh support air mat 17 for supporting the seat occupant's buttocks and thigh, respectively, whereas inside the seat back 5 is arranged, as support means, a lumbar support air mat 19 for supporting the seat occupant's lumbar. Additionally, inside the cushion side support portions 7 and 9 are arranged, as support means, cushion side support air mats 21 and 23 for supporting the sides of the occupant's legs, whereas inside the back side support portions 11 and 13 are arranged, as support means, back side support air mats 25 and 27 for supporting the sides of the occupant's arms.

Each of the air mats 15, 17, 19, 21, 23, 25, and 27 is connected with a conduit 31 which branches off from a discharge port of a pump 29. The conduit 31 branches out into four portions, each being provided with a valve 33. The conduit 31, the pump 29, and the valves 33 are elements of an actuator means.

The contour of the seat S can be varied by inputting and outputting air to and from each of the air mats 15, 17, 19, 21, 23, 25, and 27 so as to expand and contract them. This variation in contour of the seat S allows the seat occupant to maintain an optimum posture on the seat S at any time during driving.

It is to be noted that the support means may be of the electromagnetic type and/or the vibrator type in place of the aforementioned air mat type.

On a seat belt 35 is arranged, as body displacement detecting means for detecting the physical displacement of the seat occupant induced by a change in his posture on the seat S, a seat belt displacement detecting sensor 37 which provides information to a control means comprising a microcomputer 39.

It is to be noted that a pressure sensor to be arranged inside the seat S and a television camera may serve as the body displacement detecting means. In the former case, the physical displacement of the seat occupant is determined by the output of the pressure sensor, whereas in the latter case, the physical displacement is detected based on an image picked up by the camera.

A vehicle speed detecting means for detecting a running state of the vehicle comprising a vehicle speed sensor 41 is connected to the microcomputer 39. Also, manual command detecting means 45 are connected to the microcomputer 39 so as to detect the state (ON or OFF) of a manually operable means for controlling the valves 33 by manual command comprising a manual switch 43.

The microcomputer 39 includes a memory which stores a predetermined value of a seat belt displacement detected when the occupant sits on the seat S and attaches the seat belt 35, and it determines the physical displacement of the occupant by comparing the value detected by the seat belt displacement detecting sensor 37 with this predetermined value.

The microcomputer 39 determines that the seat occupant has moved when the value detected by the seat belt displacement detection sensor 37 is greater than the aforementioned predetermined value, and it determines that the occupant has become fatigued when the count of a counter reaches a predetermined setting. The microcomputer 39 then outputs a signal to control one or more of the valves 33, thus adjusting the air pressure within, for example, the lumbar support air mat 19.

Additionally, the microcomputer 39 is an element of an automatic mode setting means for setting an automatic mode of variation of the seat contour. Specifically, by incorporating the timing, the position, and the amount of a manual command into an initial automatic mode of variation, the microcomputer 39 creates a new automatic mode of variation on the basis of which the seat contour is controlled.

Referring to FIG. 2, the operation of this embodiment will be described.

In step S1, it is determined whether an ignition switch is turned on or not. If the ignition switch is turned on, the routine proceeds to step S2 where it is determined whether a vehicle speed is detected by a vehicle speed sensor 41 or not. That is, it is determined whether the vehicle is running or not. If the answer in step S2 is YES, i.e., if the vehicle is running, the routine proceeds to step S3. On the other hand, even if the vehicle is not running, it is determined that the vehicle will start soon with the ignition switch turned on, so the routine at step S2 is repeatedly executed.

In step S3, all or some of the valves 33 are controlled at a predetermined cycle corresponding to an initial automatic mode of variation of the seat contour indicated by a solid line in FIG. 3(b). Specifically, in this embodiment, for example, the air pressure within the lumbar support air mat 19 is controlled to vary the contour of the seat S.

Various methods can be employed for decreasing the fatigue of the occupant:

1) Repeatedly expanding and contracting the air mat a predetermined number of times based on a valve setting so established as to open and close the valve by the aforementioned predetermined number of times after every lapse of a predetermined period of time.
2) Perform the supply and discharge of air to and from the air mat one time during a predetermined period of time.
3) Shake, for example, the lumbar support portion up and down, and the buttock support portion back and forth by a motor during a predetermined period of time.
4) Vibrate, for example, the aforementioned support portion(s) by a vibrator during a predetermined period of time.

Additionally, the seat S may be so constructed that a cycle of expansion and contraction of the air mat, for example, is selected by the seat occupant, or so that the cycle is automatically selected by a sensor for detecting a physical characteristic of the seat occupant.

In subsequent step S4, it is determined whether or not manual control is performed through the manual switch 43 so as to vary the contour of the seat S. If manual control is not performed, the routine returns to step S3 so as to continuously execute control of the valves 33 based on the initial automatic mode.

On the other hand, if it is determined in step S4 that manual control is performed, the routine proceeds to step S5 where the timing, the position, and the magnitude of a manual control command are stored in the microcomputer 39 via the manual command detecting means 45.

In subsequent step S6, the initial mode of variation used in step S3 is rewritten by incorporating thereinto the aforementioned timing, position, and magnitude of the manual control command, thus determining a second automatic mode of variation of the seat contour.

Subsequently, in step S7, the contour of the seat S is automatically controlled based on the second mode of variation which, being based on the physical state of the seat occupant, contributes to a decrease in fatigue without causing discomfort. The second mode of variation is maintained for a predetermined period of time $t_1$.

In step S8, it is determined whether the second automatic mode of variation has been maintained for the predetermined period of time $t_1$ or not. If the answer in step S8 is YES, and a manual control command is not performed during the predetermined period of time $t_1$, the mode of variation of a seat contour returns to the initial mode of variation (step S8→S4→S3).

As described above, when the seat occupant recovers from his fatigue, the automatic mode of variation returns to the initial mode. In the event the seat S is occupied by another, this arrangement permits the seat to deal with individual variation in fatigue. Alternatively, after determination of the second mode of variation, the seat contour may be varied according to the second mode. When the second mode of variation is canceled by a cancel switch, for example, the seat mode may return to the initial mode of variation.

Referring to FIG. 3, the timing of the initial automatic mode of variation and the timing of a manual control command are schematically shown in accordance with a typical driving pattern of the motor vehicle.

While the seat contour is being controlled in a predetermined cyclical manner, if it is determined from the value the detected by the seat belt displacement detecting sensor 37 that the seat occupant has moved due to fatigue, the seat contour is varied so as to reduce the fatigue, causing irregularity in the initial mode of variation (as shown by the pulse signal drawn with a dotted line in the center of FIG. 3(b)).

Referring to FIG. 4, a manual command which is performed as shown in FIG. 3(c) is incorporated into the initial mode to obtain a second mode of variation, various examples of which are shown in FIGS. 4(c)–4(g).

The mode indicated as "mode A" is one in which the timing of the manual command is simply superimposed on the initial mode. After occurrence of a manual command, the seat contour is varied based on mode A for a predetermined period of time $t_1$. It is to be noted that the timing of the manual command may be incorporated into the initial mode only in a predetermined time zone of the initial mode.

The mode of variation indicated as "mode B" is one in which the timing of the manual command is used instead of the timing of the initial mode. If a manual command is not generated during the predetermined period of time $t_1$, the mode of variations returns to the initial mode.

The mode of variation indicated as "mode C" is one in which, and the initial mode is canceled. Accordingly, "mode C" can be maintained until driving is terminated. The mode of variation may return from mode C to the initial mode upon termination of driving, or it may be maintained when driving next takes place. In the latter case, the seat contour may be controlled in a reproduced manner, i.e., based on the initial mode during a period of time ranging from the start of driving to the last manual command, and with "mode C" thereafter, or it may be controlled with "mode C" from the beginning of driving.

The mode indicated as "mode D" is one in which corrections such as turning-off or quantitative modification of the initial mode are incorporated into the initial mode. In this example, turning-off and a partial decrease in the magnitude of the initial mode are controlled by manual command.

As described above, the contour of the seat S is controllable by incorporating a manual command into an initial automatic mode of variation, thereby decreasing the fatigue of the seat occupant without causing any discomfort.

It is to be noted that instead of the manual command being used to alter the timing of the initial mode, it can be used to alter the amount by which a support is adjusted or the location of the support which is adjusted in the initial mode.

The fatigue of the seat occupant is revealed by a) flicker value, b) amount of eyeball motion, c) myoelectric potential, d) bloodstream/blood pressure, or e) dermal temperature. These parameters which indicate fatigue of the seat occupant can be sensed by a suitable sensor 46 disposed in the vicinity of the seat 3 and connected to the microcomputer 39. Each of these parameters has the following relationship with fatigue.

a) Flicker value is an index indicative of the consciousness level of the cerebrum. The higher the flicker value, the higher is the consciousness level. This value decreases with increase in fatigue or drowsiness.

b) Amount of eyeball motion is examined on an electrooculogram (EOG). If driving is continued for a few hours or more, the amplitude and the frequency of eyeball motion both decrease, whereas the frequency of blinking increases considerably. These correspond to a wakeness level.

c) Myoelectric potential is examined using electromyograman (EMG). When fatigue reaches a predetermined level, a waveform with a large amplitude begins to appear on the trapezius, and the frequency of occurrence of a fine waveform is increased.

d) Bloodstream/blood pressure. In parts of the anatomy such as the buttocks which always are subjected to pressure due to sitting, fatigue or numbness may be induced by constriction of the blood supply.

e) Dermal temperature. Fatigue is detectable from a decrease in dermal temperature due to bad blood circulation.

It is to be noted that the seat S of the present invention is applicable not only to motor vehicles, but to vessels, aircraft, and the like.

We claim:

1. A seat for a seat occupant comprising:
a seat cushion;
a seat back extending from said seat cushion;
a support disposed within said seat cushion or said seat back;
an actuator operatively connected to said support;
fatigue sensing means for sensing fatigue of the seat occupant;
manually operable command generating means for generating a manual command for said actuator; and
a control system comprising:
means responsive to the fatigue sensing means for controlling the actuator to operate in a first operating state in while the actuator varies a characteristic of the support according to an initial mode of variation when the fatigue sensing means senses fatigue of the seat occupant; and
means responsive to a command from the command generating means for controlling the actuator to switch from the first operating state to a second operating state in which the actuator varies a characteristic of the support according to a second mode of variation upon the generation of the manual command.

2. A seat as claimed in claim 1 wherein said fatigue sensing means comprises means for sensing a flicker value of the seat occupant.

3. A seat as claimed in claim 1 wherein said fatigue sensing means comprises means for sensing the amount of eyeball motion of the seat occupant.

4. A seat as claimed in claim 1 wherein said fatigue sensing means comprises means for sensing the myoelectric potential of the seat occupant.

5. A seat as claimed in claim 1 wherein said fatigue sensing means comprises means for sensing the blood pressure of the seat occupant.

6. A seat as claimed in claim 1 wherein said fatigue sensing means comprises means for sensing the dermal temperature of the seat occupant.

7. A seat for a seat occupant, comprising:
a seat cushion;
a seat back extending from said seat cushion;
a support disposed within said seat cushion or said seat back;
an actuator operatively connected to said support for varying a characteristic of said support;
manually operable command generating means for generating a manual command for said actuator; and
a control system comprising:
means for automatically selecting a first operating state for said actuator a controlling said actuator to operate in said first operating state, said actuator cyclically varying a characteristic of said support according to a first mode of variation in said first operating state; and
means responsive to a command from the command generating means for controlling the actuator to switch from the first operating state to a second operating state corresponding to the command from the command generating means, the actuator varying a characteristic of the support according to a second mode of variation different from the first mode of variation in said second operating state.

8. A seat as claimed in claim 7 wherein said support comprises an air mat.

9. A seat as claimed in claim 7 wherein said support comprises a lumbar support disposed in said seat back so as to support the occupant's lumbar.

10. A seat as claimed in claim 7 wherein said support comprises a buttock support disposed in said seat cushion so as to support the occupant's buttocks.

11. A seat as claimed in claim 7 wherein said support comprises a thigh support disposed in said seat cushion so as to support a thigh of the occupant.

12. A seat as claimed in claim 7 wherein said support comprises a cushion side support disposed in said seat cushion so as to support a leg of the occupant.

13. A seat as claimed in claim 7 wherein said support comprises a back side support disposed in said seat back so as to support an arm of the occupant.

14. A seat as claimed in claim 7 wherein said control system includes a microcomputer based control unit and a plurality of sensors.

15. A seat as claimed in claim 7 wherein said first mode of variation is a function of the length of time passing after the occupant has sat on the seat cushion.

16. A seat as claimed in claim 7 wherein said control system comprises means for controlling said actuator to maintain said second operating state for a predetermined period of time after generation of said manual command by said command generating means and thereafter automatically return to said first operating state.

17. A seat as claimed in claim 7 wherein said second mode of variation results from superimposing a mode indicated by said manual command on said first mode of variation.

18. A seat as claimed in claim 7 wherein said second mode of variation results from replacing said first mode of variation with a mode indicated by said manual command.

19. A seat as claimed in claim 7 wherein said second mode of variation is maintained at least until the seat occupant leaves said seat cushion.

20. A seat as claimed in claim 7 wherein said manual command from said command generating means is indicative of magnitude of variation of said characteristic of said support.

21. A seat as claimed in claim 19 wherein said second mode differs from said first mode with respect to the magnitude of variation of said characteristic of said support.

22. A seat as claimed in claim 7 wherein said actuator comprises a pump, conduit means for establishing fluid communication between said pump and said support, and valve means disposed in said conduit means for controlling supply of air to and discharge of air from said support.

23. A seat as claimed in claim 22 wherein said command generating means includes a manual switch operatively connected to said valve means.

24. A seat for a seat occupant comprising:
a seat cushion;
a seat back extending from said seat cushion;
a plurality of supports disposed within the seat cushion or the seat back;
an actuator operatively connected to the plurality of supports for varying a characteristic of the supports;
selecting means for enabling the seat occupant to manually select an operating state of the actuator and for generating a command indicating the selected mode; and
a control system comprising:
means for automatically selecting a first operating state for the actuator and controlling the actuator to operate in the first operating state in which the actuator cyclically varies a characteristic of the supports according to a first mode of variation; and means responsive to a command from the selecting means for controlling the actuator to switch from the first operating state to a second operating state in which the actuator cyclically varies a characteristic of the supports according to a second mode of variation different from the first mode of variation with respect to the location or magnitude of variation.

25. A seat for a seat occupant, comprising:
a seat cushion;
a seat back extending from said seat cushion;
a support disposed within said seat cushion or the seat back;
an actuator operatively connected to the support for controlling a characteristic of the support;
selecting means for enabling the seat occupant to select a mode of operation of the actuator from a plurality of different modes of operation and for generating a command indicating the selected mode;
fatigue sensing means for sensing fatigue of the seat occupant; and
a control system comprising:
means responsive to the fatigue sensing means for automatically controlling the actuator to operate in a first operating state in which the actuator varies a characteristic of the support according to an initial mode of variation when the fatigue sensing means senses fatigue of the seat occupant; and
means responsive to a command from the selecting means for controlling the actuator to automatically switch from the first operating state to a second operating state in which the actuator varies a characteristic of the support according to a second mode of variation corresponding to a manual command generated by the selecting means upon generation of the manual command by the selecting means.

26. A seat for a seat occupant, comprising:
a seat cushion;
a seat back extending from the seat cushion;
a support disposed within the seat cushion or the seat back;
an actuator operatively connected to the support for controlling a characteristic of the support;
selecting means for enabling the seat occupant to select a mode of operation of the actuator and for generating a command indicating the selected mode;
a control system comprising:
means for controlling the actuator to operate in a first operating state in which the actuator varies a characteristic of the support according to a first mode of variation;
means responsive to a command from the selecting means for controlling the actuator to switch from the first operating state to a second operating state in which the actuator varies a characteristic of the support according to a second mode of variation; and
means for returning the actuator to the first operating state when the selecting means has not generated a command for a prescribed length of time.

27. A seat for a seat occupant comprising:
a seat cushion;
a seat back extending from the seat cushion;
a support disposed within the seat cushion or the seat back;

an actuator operatively connected to the support for controlling a characteristic of the support;

selecting means for enabling the seat occupant to select a mode of operation of the actuator and for generating a command indicating the selected mode;

fatigue sensing means for sensing fatigue of the seat occupant when the amount of movement of a portion of the body of the seat occupant exceeds a prescribed level; and a control system comprising:

means responsive to the fatigue sensing means for controlling the actuator to operate in a first operating state in which the actuator varies a characteristic of the support according to a first mode of variation when the fatigue sensing means senses fatigue of the seat occupant; and means responsive to a command from the selecting means for controlling the actuator to switch from the first operating state to a second operating state in which the actuator varies a characteristic of the support according to a second mode of variation when a command is generated by the selecting means.

28. A seat for a seat occupant, comprising:

a seat cushion;

a seat back extending from said seat cushion;

a seat belt system operatively associated with said seat cushion and said seat back to secure the seat occupant with respect to said seat cushion and said seat back;

a support disposed within said seat cushion or said seat back;

an actuator operatively connected to said support;

displacement sensing means for detecting a displacement of a portion of said seat belt system;

command generating means manually operable by the seat occupant for generating a manual command for said actuator; and a control system comprising:

fatigue sensing means to responsive to the displacement sensing means for sensing when the seat occupant is fatigued based on the displacement detected by the displacement sensing means;

means responsive to the fatigue sensing means for controlling the actuator to operating in a first operating state in which the actuator varies a characteristic of the support according to an initial mode of variation when the fatigue sensing means senses that the seat occupant is fatigued; and means responsive to a manual command from the command generating means for controlling the actuator to switch from the first operating state to a second operating state in which the actuator varies a characteristic of the support according to a second mode of variation.

29. A method of controlling an actuator operatively connected to a support disposed within a seat in a motor vehicle, the method comprising the steps of:

repeatedly checking whether the motor vehicle is travelling;

generating a manual command indicative signal when a manual command for the actuator is generated;

repeatedly checking whether said manual command indicative signal is generated while the motor vehicle is travelling;

automatically selecting an initial mode of variation of the support;

controlling the actuator to cyclically vary a characteristic of the support according to the initial mode of variation until said manual command indicative signal is generated; and automatically controlling the actuator to vary the characteristic of the support according to a second mode of variation upon generation of said manual command indicative signal.

30. A method as claimed in claim 29 wherein varying the characteristic according to the second mode of variation comprises superimposing a mode indicated by the manual command indicative signal upon the initial mode of variation.

31. A method as claimed in claim 29 wherein said manual command indicative signal is indicative of the magnitude of variation of the characteristic of the support, and the second mode of variation differs from the initial mode of variation with respect to the magnitude of the variation of the characteristic of the support.

32. A method as claimed in claim 29 further comprising the step of:

automatically controlling the actuator to vary the characteristic of the support according to said initial mode of variation upon elapse of a predetermined period of time after generation of said manual command indicative signal.

33. A method as claimed in claim 29 wherein varying the characteristic according to the second mode of variation comprises replacing the initial mode of variation with a mode indicated by the manual command indicative signal.

* * * * *